(No Model.)
J. PATRICK.
RUBBER TIRE FOR WHEELS.
No. 599,249. Patented Feb. 15, 1898.
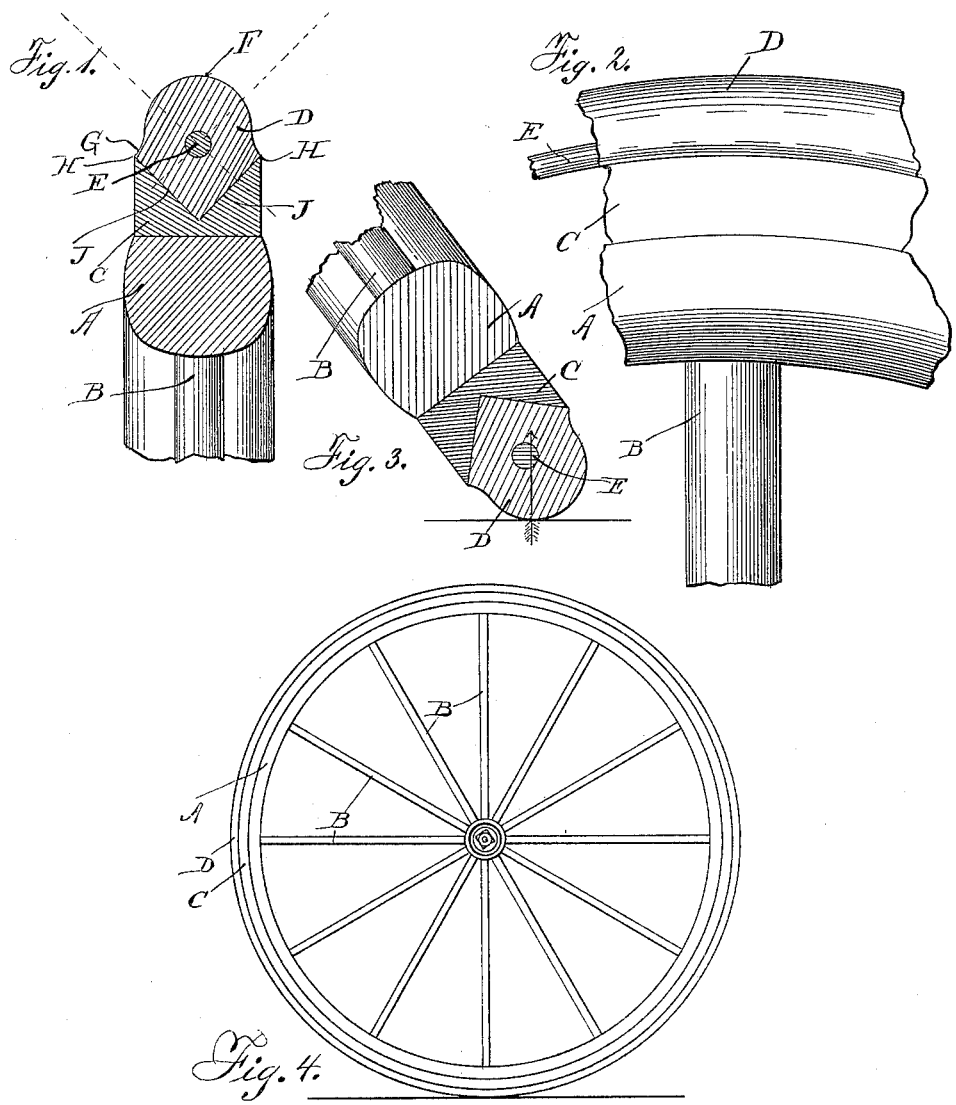

UNITED STATES PATENT OFFICE.

JOHN PATRICK, OF CHICAGO, ILLINOIS.

RUBBER TIRE FOR WHEELS.

SPECIFICATION forming part of Letters Patent No. 599,249, dated February 15, 1898.

Application filed September 2, 1896. Serial No. 604,604. (No model.)

*To all whom it may concern:*

Be it known that I, JOHN PATRICK, a citizen of the United States, residing at Chicago, in the county of Cook and State of Illinois, have invented certain Improvements in Rubber Tires for Wheels, of which the following is a specification.

My invention relates to elastic tires for vehicles, particularly rubber tires, and has for its object to provide certain new and useful improvements in such tires. It is illustrated in the accompanying drawings, wherein—

Figure 1 is a cross-section through the rim of a wheel. Fig. 2 is a side view of a portion of such rim. Fig. 3 is a view of a portion of the rim, showing the wheel inclined and a variation in the line of pressure. Fig. 4 is a view of a complete wheel.

Like parts are indicated by the same letters in all the figures.

A A represent the fellies; B B, the spokes; C, the metal rim or tire; D, the outer elastic rim or tire, preferably of rubber; E, a retaining-rod embedded in the elastic tire. This tire is preferably shaped substantially as shown—that is to say, with the outer bearing-surface curved or arc-shaped, as indicated at F. It also has the retreating surfaces G G near the edges H H of the metal rim. These retreating surfaces are not indispensable. The metallic rim is provided with the flat surfaces J J, preferably at substantially right angles to each other and adapted to receive the inner surfaces of the elastic tire. The dotted lines in Fig. 1 indicate somewhat approximately the arc of bearing-surface of the elastic tire and also indicate, together with the arrow in Fig. 3, that the line of pressure passing through the elastic tire never tends to disengage either of the inner elastic-tire surfaces from the metal faces, to which they are preferally glued. By examining the device of Fig. 3 and turning the wheel laterally, so as to incline it in the opposite direction, it will be found that in all practical positions and where there would be a substantial bearing through the elastic tire the line of the pressure arising from such bearing is such as to always force the elastic tire against the metal tire at all meeting surfaces, thus obviating any possible tendency of such pressure as the wheel would encounter in ordinary use from displacing or unseating the elastic tire.

The use and operation of the device have been sufficiently explained and set out by the foregoing description. The rod E is not indispensable, but tends to hold the elastic tire in its socket, not, however, against the pressure arising from the bearing of the tire on the ground. The line of the pressure from such bearing of the wheel on the ground is ordinarily through the rod.

I claim—

As an article of manufacture a wheel having a felly extended therearound, a metallic rim or tire surrounding said felly, said rim or tire provided with a V-shaped groove extending completely around the wheel, an elastic tire having a V-shaped projection which fits into the V-shaped groove in the metallic rim, said elastic tire cut away so as to be provided with retreating surfaces just above the edges of the metallic rim so that the edges of said rim are prevented from cutting and injuring the tire, an opening near the center of said tire extending therearound, and a metallic wire contained within said opening substantially on a line with the upper edges of the metallic rim, substantially as described.

JOHN PATRICK.

Witnesses:
BERTHA C. SIMS,
LILLEY W. JOHNSTONE.